United States Patent
Kim et al.

(10) Patent No.: US 7,226,977 B2
(45) Date of Patent: Jun. 5, 2007

(54) HIGH MELT FLOW RATE THERMOPLASTIC POLYOLEFINS PRODUCED IN-REACTOR

(75) Inventors: Sehyun Kim, Murrysville, PA (US); Andrew L. Schnitgen, Cranberry Township, PA (US); Ruben A. Migone, Pittsburgh, PA (US); Jeffrey S. Salek, Oakdale, PA (US)

(73) Assignee: Sunoco, Inc. (R&M), Philadelphia, PA (US)

( * ) Notice: Subject to any disclaimer, the term of this patent is extended or adjusted under 35 U.S.C. 154(b) by 332 days.

(21) Appl. No.: 10/827,636

(22) Filed: Apr. 19, 2004

(65) Prior Publication Data

US 2005/0234196 A1  Oct. 20, 2005

(51) Int. Cl.
 *C08L 23/04* (2006.01)
 *C08L 23/12* (2006.01)

(52) U.S. Cl. ............ 525/240; 525/191; 525/243; 525/322; 525/323

(58) Field of Classification Search ........... 525/240, 525/243, 322, 323, 191
See application file for complete search history.

(56) References Cited

U.S. PATENT DOCUMENTS

| | | | |
|---|---|---|---|
| 5,066,723 A * | 11/1991 | Randall et al. ............ | 525/194 |
| 5,258,464 A | 11/1993 | McCullough, Jr. et al. | |
| 5,262,487 A | 11/1993 | Fujita et al. | |
| 5,286,791 A * | 2/1994 | DeNicola et al. ............ | 525/71 |
| 5,298,561 A | 3/1994 | Cecchin et al. | |
| 5,414,027 A * | 5/1995 | DeNicola et al. ........... | 522/112 |
| 5,470,900 A | 11/1995 | Sasaki et al. | |
| 6,284,833 B1 | 9/2001 | Ford et al. | |
| 6,399,707 B1 * | 6/2002 | Meka et al. ............ | 525/191 |
| 6,489,019 B1 * | 12/2002 | Shah et al. ............ | 428/325 |
| 6,723,829 B1 * | 4/2004 | Malm et al. ............ | 528/481 |

FOREIGN PATENT DOCUMENTS

| | | |
|---|---|---|
| EP | 0 640 648 A1 | 3/1995 |
| EP | 0 884 357 A1 | 12/1998 |
| JP | 09227735 | 2/1997 |
| WO | WO 98/31744 | 7/1998 |
| WO | WO 03/031513 A1 | 4/2003 |

OTHER PUBLICATIONS

Development of UNIPOL PP High Melt Flow Polypropylene Impact Copolymers with Improved Impact Stiffness Balance, R. James Kersting, Union Carbide Corporation, Presented at PROPYLRENE '99, 8th Annual World Conference, Zurich Switzerland, Sep. 14-16, 1999.

* cited by examiner

*Primary Examiner*—James J. Seidleck
*Assistant Examiner*—Olga Asinovsky
(74) *Attorney, Agent, or Firm*—Robert A. Koons, Jr.; Matthew P. McWilliams; Drinker Biddle & Reath LLP

(57) ABSTRACT

A thermoplastic polyolefin having a melt flow rate of 20 dg/min or higher at 230° C. is produced in reactor without visbreaking. By controlling ratio of the weight average molecular weight of the xylene soluble fraction to the weight average molecular weight of the xylene insoluble fraction, a high melt flow thermoplastic polyolefin can be produced having a good balance of impact and stiffness, tensile elongation at break and gloss properties. Optionally, the ratio of the melt flow rate of the homopolymer phase to the melt flow rate of the total thermoplastic polyolefin can also be controlled. By compounding thermoplastic polyolefins according to the current invention with one or more modifiers, additional compositions can be produced having improved resistance to solvents.

16 Claims, No Drawings

HIGH MELT FLOW RATE THERMOPLASTIC POLYOLEFINS PRODUCED IN-REACTOR

FIELD OF THE INVENTION

The present invention is drawn to the field of polypropylene copolymers. More particularly the present invention is drawn to the field of thermoplastic polyolefins. Most particularly the present invention is drawn to the field of in-reactor produced thermoplastic polyolefins having melt flow rates of 20 dg/min or higher at 230° C.

BACKGROUND OF THE INVENTION

Thermoplastic polyolefins (TPOs) have a wide range of applications, most notably in automobile parts. In general, TPOs are defined as impact modified polymers containing greater than 20 weight percent of ethylene/propylene rubber (EPR) or other rubber. It is known that TPOs may be produced either by mechanical compounding of a polypropylene homopolymer or copolymer with an EPR, other rubber, or copolymer with additional rubber. Alternatively, TPOs may be produced by forming the rubber phase in-reactor consecutively after forming the propylene homopolymer or copolymer. Reactor production is more cost effective and is known to provide more consistent properties, resulting in cost savings of up to 10–15%

It is known that the properties of TPOs are governed by various structural features, such as rubber particle size and distribution, isotacticity of the propylene homopolymer and the composition (e.g. ethylene content) of the rubber phase. Maier and Calafut report in "Polypropylene: The Definitive User's Guide and Handbook", p. 23, ©1998, *Plastic Design Library*, in-reactor made TPOs have rubber phases with finer particle sizes that are more uniformly distributed in the polypropylene matrix, but that properties cannot be tailored for specific applications. It is also known that it is difficult to obtain desirable properties in TPOs that are made in-reactor, especially when the material has a melt flow rate of 20 dg/min or greater at 230° C. These properties include stiffness/impact balance, tensile elongation at break and surface gloss. In order to improve these properties of in-reactor materials, controlled rheology (CR) is often employed, in which a low melt flow rate TPO is cracked (visbroken) to a higher melt flow rate in the presence of peroxide, such as to greater than 20 dg/min at 230° C. Although controlled rheology improves tensile elongation at break, low temperature impact properties, and surface gloss in molded articles, the stiffness of such articles is reduced significantly compared to non-CR'd (non-visbroken) materials.

The generally accepted conditions for optimized impact properties in impact modified polymers are uniform rubber particle dispersion and a small, optimum, rubber particle size. In, "Development of UNIPOL™ PP High Melt Flow Polypropylene Impact Copolymers with Improved Impact Stiffness Balance", 1999, presented at PROPYLENE '99, Kersting reports that the melt viscosity ratio between the EPR rubber phase and the propylene homopolymer phase is the controlling factor for impact properties. Kersting further reports that for a medium impact copolymer having 14–20 weight percent of a rubber phase containing 50–55 weight percent ethylene, the impact/stiffness balance is significantly improved at a high viscosity ratio. The high ratio reported is indicative of a high molecular weight EPR.

In contrast, U.S. Pat. No. 5,258,464 to McCullough, Jr. et al. teaches polypropylene impact copolymers that have an improved resistance to stress whitening. In the impact copolymers disclosed by McCullough, Jr., the ratio of the intrinsic viscosities of the propylene homopolymer phase and the copolymer rubber phase is near 1 as determined by an equation provided in the specification of McCullough, Jr. The copolymer phase of the impact copolymers disclosed in McCullough, Jr. comprises 10 to 50 weight percent of the total polymer. Further, the copolymer phase contains from 38 to 60 weight percent of ethylene based on the total weight of the copolymer phase. According to the teaching of McCullough, Jr., the actual intrinsic viscosities of the homopolymer and copolymer phase are not important, so long as the ratio of those viscosities is close to 1. McCullough, Jr. also teaches that when polymers of high melt flow are prepared the required ratio of intrinsic viscosities can only be obtained in a gas phase polymerization.

Both Kersting and McCullough, Jr. rely on viscosity ratios as a measure of molecular weight ratio for optimizing the performance of impact modified polypropylene. However, Kersting does not address TPOs and McCullough does not address the balancing of impact strength and stiffness. Additionally, both melt viscosity and intrinsic viscosity, while related to molecular weight, are imprecise measures of molecular weight.

As a result, there remains a need for high melt flow in reactor produced TPOs that combine the desirable properties of an in reactor TPO and a compounded TPO, without the need for visbreaking. Further, there remains a need for such high melt flow, in reactor produced TPOs that can be produced in a liquid phase, gas phase or combined liquid/gas phase polymerization.

SUMMARY OF THE INVENTION

The present invention provides in-reactor produced thermoplastic polyolefin (TPO) compositions having a melt flow rate (MFR) of about 20 dg/min or higher at 230° C. without visbreaking, and good impact/stiffness balance and other desirable properties heretofore not attainable in an in-reactor produced thermoplastic polyolefin of high melt flow rate.

Generally speaking, the compositions according to the current invention comprise a xylene insoluble fraction, which is predominantly a polypropylene homopolymer or random copolymer, and a xylene soluble fraction, which is predominantly ethylene/propylene copolymer rubber. The compositions of the present invention attain improved properties via combined control of the content of xylene solubles in the TPO, the content of ethylene in the xylene solubles, and the ratio of the molecular weight of the xylene soluble fraction, $Mw_{(XS)}$, to the molecular weight of the xylene insoluble fraction, $Mw_{(XIS)}$. As a further property, the ratio of the melt flow rate of the polypropylene homopolymer or random copolymer to the melt flow rate of the total polymer may be controlled.

Thermoplastic polyolefin compositions according to the present invention contain from about 20 to about 40 percent by weight, preferably from about 20 to about 30 percent by weight, of a xylene soluble fraction, which comprises an EPR rubber. Further, the xylene soluble fraction has an ethylene content of about 45 weight percent or less, preferably from about 25 to about 45 percent by weight, based on the weight of the xylene soluble fraction. The ratio of the molecular weight of the xylene soluble fraction to the molecular weight of the xylene insoluble fraction is less than 1.4, preferably from about 1 to about 1.4, with values closer to 1 being more preferred. In one embodiment the ratio of the melt flow rate of the polypropylene homopolymer or random copolymer to the melt flow rate of the total polymer is from about 0.5 to about 2.2.

Thermoplastic polyolefin compositions according to the current invention may be compounded with any of various modifiers, such as linear low density polyethylene, low density polyethylene, high density polyethylene, metallocene ethylene propylene copolymer and KRATON™ polymers, which are a class of linear or branched styrene-butadiene (SB), styrene-isoprene (SI) and styrene-butadiene-styrene (SBS), styrene-ethylene-butylene-styrene (SEBS) and styrene-ethylene-propylene-styrene (SEPS) block copolymers available from KRATON Polymers, to produce further compositions that find use in a number of applications, including, but not limited to automotive, appliances and packaging. By compounding the thermoplastic polyolefins according to the current invention with an impact modifier, a composition exhibiting enhanced resistance to solvents, such as those in paint, can be produced.

Also, the TPO compositions according to the present invention may be further modified to even higher melt flow rates by controlled rheology as desired.

DETAILED DESCRIPTION OF THE INVENTION

The compositions according to the current invention are polypropylene impact copolymers. More particularly, the compositions according to the current invention are thermoplastic polyolefins (TPOs). In general, the TPOs of the current invention are heterophasic compositions that comprise a crystalline propylene homopolymer or random copolymer as a xylene insoluble continuous phase and an amorphous propylene/α-olefin copolymer rubber as a xylene soluble discontinuous phase dispersed in the continuous phase. The dispersed copolymer rubber phase preferably comprises an ethylene/propylene rubber (EPR). More particularly, the compositions of the current invention are TPOs having a melt flow rate of at least 20 dg/min at 230° C. Even more particularly, the compositions of the current invention are TPOs that are produced in-reactor, as opposed to by blending of separately produced propylene homopolymer and copolymer rubber. Further, the TPOs according to the current invention are not visbroken to attain a melt flow rate above 20 dg/min, but may be modified by controlled rheology to attain even higher melt flow rates as desired.

In general, in-reactor produced TPOs are produced by sequential polymerization reactions in a series of two or more reactors. For example, in one or more first reactor(s) propylene is polymerized to form a propylene homopolymer or copolymer, such as a random copolymer, which serves as the continuous phase in the TPO. This homopolymer or copolymer is then passed to one or more subsequent reactor(s) wherein propylene is co-polymerized with ethylene to form a copolymer rubber, which comprises the dispersed phase. Polymerization reactions in such multi-stage processes can be either gas phase or liquid phase, with either monomer or an inert solvent serving as the polymerization media.

Compositions according to the current invention are produced in such multi-stage polymerizations, using two or more sequential reactors. Further, the compositions according to the current invention can be produced by either gas phase or liquid phase processes, or combination liquid/gas phase processes. According to a preferred embodiment of the current invention, the inventive composition is produced via a first polymerization step to form a propylene homopolymer or random copolymer, carried out in at least one liquid phase reactor, followed by a second step co-polymerization of ethylene and propylene to form an ethylene/propylene copolymer rubber (EPR) in at least one gas phase reactor. Most preferably, the polymerization steps are followed by an extrusion and pelletization step to pelletize the composition formed in the two polymerization steps.

In characterizing heterophasic compositions containing EPR, one can define the relative concentrations of ethylene in the polymer in a number of different ways. These include: (1) the absolute content of ethylene in the composition as a whole; (2) the content of ethylene in the ethylene containing polymer species as a whole; and (3) the content of ethylene in the ethylene/propylene rubber. Further, the content of ethylene/propylene copolymer formed in the second stage polymerization step can be defined alternatively as: (1) the amount of ethylene containing polymer (copolymer) species in the composition as a whole and (2) the content of ethylene/propylene rubber in the composition as a whole. A number of authors have referred to the content of ethylene/propylene rubber and the content of ethylene/propylene copolymer species formed in the second stage polymerization as equivalents. However, it is important to recognize that the ethylene/propylene copolymer formed in the second stage polymerization is often not exclusively EPR rubber. In in-reactor produced TPOs the copolymer formed in the second stage co-polymerization of ethylene and propylene generally comprises a fraction of crystalline ethylene homopolymer and other ethylene-rich copolymers, as well as, the desired amorphous EPR. Potentially, a small amount of ethylene-poor species may also form in this step. In general, the EPR content will be more accurately represented by the xylene or decalin soluble portion of the composition, the crystalline ethylene homopolymer and copolymers being insoluble. This measure of EPR content is used in U.S. Pat. No. 5,262,487 to Fujita, et al.

While a more accurate measure of EPR content, it must still be recognized that the xylene or decalin soluble portion of the composition will contain some fraction of soluble amorphous propylene homopolymer.

The in-reactor TPO compositions according to the current invention are characterized based on the total amount of xylene solubles and xylene insolubles, as determined by the method prescribed in ASTM-5492. The compositions according to the current invention comprise from about 60 to about 80 percent by weight, preferably from about 70 to about 80 percent by weight, of a xylene insoluble fraction, which comprises most of the polypropylene homopolymer or copolymer produced in the first stage polymerization and any insoluble species produced in the second stage polymerization. Further, the compositions of the current invention comprise from about 20 to about 40 percent by weight, preferably from about 20 to about 30 percent by weight, of a xylene soluble fraction, which comprises mainly the EPR rubber produced in the second stage polymerization, but may contain small amounts of other soluble species produced in the first or second stage polymerizations.

Further, the xylene soluble fraction of the TPO compositions of the current invention are characterized as having an ethylene content of about 45 percent by weight or less, based on the total weight of the xylene soluble fraction. Preferably, the compositions according to the current invention have a xylene soluble fraction with an ethylene content of from about 25 to about 45 percent by weight.

For a TPO having the above properties, when the ratio of the weight average molecular weight of the xylene soluble fraction $Mw_{(XS)}$ to the weight average molecular weight of the xylene insoluble fraction $Mw_{(XIS)}$ is less than 1.4 a high melt flow rate material can be produced in-reactor having a good impact/stiffness balance, as well as, good tensile strength at break and high gloss. Exemplary properties that can be attained in high melt flow rate in-reactor produced TPOs according to the current invention include a flexural modulus of from 130 to 175 kpsi, a tensile modulus of from 150 to 180 kpsi, a Gardner Gloss at 60° of at least 70 and a tensile break strain of greater than 300%. It will be recognized that these properties are merely exemplary of those that can be obtained in TPOs according to the current invention, and are not limiting of the invention.

The TPO compositions according to the current invention preferably have a ratio, r, of from about 1.4 to about 1, with values closer to 1 being more preferred. The ratio r is calculated using the equation:

$$r = Mw_{(XS)}/Mw_{(XIS)} \text{ where:}$$

$Mw_{(XS)}$ is the weight average molecular weight (Mw) of the xylene soluble fraction, and $Mw_{(XIS)}$ is the weight average molecular weight (Mw) of the xylene insoluble fraction.

By maintaining the ratio of the molecular weight of the xylene solubles to the molecular weight of the xylene insolubles at less than about 1.4, TPOs having a melt flow rate of about 20 dg/min or higher and good stiffness can be produced directly in the polymerization reactor. The molecular weights of the xylene insoluble (homopolymer) and xylene soluble (copolymer) fractions can be controlled during the polymerization by conventional means, such as via the use of hydrogen for chain termination. The weight average molecular weight of the xylene soluble and xylene insoluble fractions is determined using high temperature size exclusion chromatography (HSEC).

In another embodiment, in addition to the weight average molecular weight ratio, r, above, the TPOs according to the current invention are further characterized by the ratio of the melt flow rate of the polypropylene homopolymer or copolymer produced in the first stage polymerization, to the melt flow rate of the total polymer. In this embodiment the ratio, r', is less than 2.2. Preferably, in this embodiment the ratio, r', is from about 0.5 to about 2.2. The ratio r' is calculated using the equation:

$$r' = MFR_{homo}/MFR_{total} \text{ where:}$$

$MFR_{homo}$ is the melt flow rate of the polypropylene phase, and $MFR_{total}$ is the melt flow rate of the total TPO.

As used in this equation, the polypropylene phase is the polypropylene homopolymer or random copolymer that is produced in the first stage of the multi-stage polymerization. The melt flow rate of the polypropylene phase can be measured by sampling the material produced in the first stage reactor(s). The melt flow rates of the homopolymer and copolymer fractions can be controlled during the polymerization by conventional means, such as via the use of hydrogen for chain termination.

Therefore, in summary, the compositions of the current invention comprise TPOs produced in a multi-stage in-reactor process, having a melt flow rate of about 20 dg/min or higher without visbreaking. The TPOs comprise from about 60 to about 80 weight percent of a xylene insoluble fraction and from about 20 to about 40 percent by weight of a xylene insoluble fraction. The xylene soluble fraction has an ethylene content of about 45 percent by weight or less, preferably about 25 percent by weight to about 45 percent by weight. The ratio, r, of the molecular weight of the xylene solubles to the molecular weight of the xylene insolubles is less than 1.4, preferably from about 1.4 to about 1. The TPOs may further be defined by the ratio, r', of the melt flow rate of the polypropylene homopolymer produced in the first stage polymerization to the melt flow rate of the total TPO being less than 2.2, preferably from about 0.5 to about 2.2.

In order to provide a fuller understanding of the benefits of the current invention, the TPO compositions will now be illustrated by way of example. It will be recognized by those skilled in the art that the following examples are merely illustrative and are not intended to limit the scope of the current invention.

EXAMPLE 1

A thermoplastic polyolefin according to the current invention was produced by sequential polymerization to produce a polypropylene homopolymer as a continuous phase in a first-stage liquid phase polymerization. The polypropylene homopolymer thus produced was transferred to a second-stage gas phase polymerization wherein ethylene was co-polymerized with propylene to produce an ethylene/propylene rubber as a discontinuous phase. The resulting thermoplastic polyolefin had the properties shown in Table 1. Also shown in Table 1 are comparative materials produced both in-reactor and by controlled rheology (CR) of a low melt flow rate in-reactor material.

The data in Table 1 show that the material produced according to the current invention has a much better balance of desirable properties than the in-reactor comparative material. The material according to the current invention displays Izod, flexural modulus and TS (tensile strength) at break that are comparable to or superior to the in-reactor comparative material, while at the same time displaying vastly superior tensile break strain and surface gloss.

Similarly, the data in Table 1 demonstrate that the material produced according to the current invention has a better balance of properties than the controlled rheology comparative material. The material according to the current invention displays TS (tensile strength) at break, break strain, tensile modulus and gloss that are comparable to or superior to the controlled rheology comparative material, while at the same time displaying vastly superior flexural modulus.

The mechanical properties of the materials were tested using the following methods: Tensile Properties (ASTM D638), Flexural Modulus (ASTM D790), Izod Impact (ASTM D256), Gloss at 60 degrees (ASTM 2457), and Instrumented Impact @–29° C. (ASTM D3763).

TABLE 1

| Property | Sample 1 | Comparative In-Reactor Material | Comparative CR'd Material |
| --- | --- | --- | --- |
| MFR total polymer | 20 dg/min | 20 dg/min | 20 dg/min |
| Xylene solubles (wt. percent) | 20.3 | 19 | 20 |
| $C_2$ content XS (wt. percent) | 42 | 44 | 37 |
| $Mw_{(XS)}/Mw_{(XIS)}$ | 1.17 | 1.9 | 1.0 |
| MFR polypropylene phase | 36 | 92 | — |
| $MFR_{homo}/MFR_{total}$ | 1.8 | 4.8 | — |
| IIMP (ft. lbs) | 38[1] | 35[2] | 36[2] |
| Izod (ft. lbs/in) | 3.0 | 4.0 | NB |
| Flexural Modulus (kpsi) | 139 | 146 | 117 |
| TS at break (psi) | 2372 | 2190 | 2265 |
| Break strain (%) | 346 | 81 | 344 |
| Tensile Modulus | 154 | 175 | 141 |
| Gloss 60 deg. | 79 | 44 | 78 |

[1]Measured at –40° C.
[2]Measured at –29° C.

It has also been discovered that by compounding the new compositions according to the current invention with one or more modifiers, materials can be produced that have additional beneficial properties, such as solvent resistance. Examples of such modifiers include, but are not limited to linear low-density polyethylene, low-density polyethylene, high-density polyethylene and KRATON™. Such modifiers can be incorporated in an amount up to 10 percent by weight of the composition.

EXAMPLE 2

Tests were run compounding the material according to the invention produced in Example 1 with a linear low density polyethylene (LLDPE) modifier available from Dow under the trade name ENGAGE® both with and without a nucleating agent. For comparison purposes, two samples of in-reactor produced materials not according to the current invention were also compounded with the same LLDPE modifier and tested. Also, two samples of controlled rheology material were compounded with LLDPE. The results for the materials according to the current invention and the comparative in-reactor materials are shown in Table 2. The results for the comparative controlled rheology materials are shown in Table 3. All of the samples were tested for solvent resistance.

The results for the solvent resistance test are shown in the bottom row of Table 2 and Table 3. This test measures the resistance of a TPO to solvents such as those that parts may be exposed to on painting. Test samples are exposed either to paint or a solvent, e.g. hexane or heptane, then baked at elevated temperature to mimic normal processing of parts fabricated from the TPO. Multiple cycles of solvent exposure and baking (generally three) are completed for each test sample. Following completion of the solvent exposure and baking cycles the samples are tested by instrumented impact (IIMP). As can be seen from the results in Table 2 and Table 3, the sample according to the current invention achieved passing results for this test, whereas the comparative samples either failed completely or had only mixed results.

What is claimed is:
1. A composition comprising:
a thermoplastic polyolefin produced by polymerizing propylene and optionally ethylene in a least one first polymerization reactor to form a propylene homopolymer or random copolymer; and
polymerizing ethylene and propylene in the presence of said propylene homopolymer or random copolymer in

TABLE 2

| Property | Sample 1 | Sample 1 (5% LLDPE) | Sample 1 (5% LLDPE) + nucleator | Comp. 1 (reactor) | Comp. 1 (reactor) (5% LLDPE) | Comp. 2 (reactor) | Comp. 2 (reactor) (5% LLDPE) |
| --- | --- | --- | --- | --- | --- | --- | --- |
| MFR | 20 | 19 | 16 | 24 | 26 | 34 | 31 |
| Flexural Modulus (kpsi) | 139 | 116 | 124 | 157 | 149 | 143 | 143 |
| Izod (ft. lbs/in) | 3.0 | NB | NB | 1.6 | — | 2.4 | — |
| Break strain (%) | 346 | 355 | 340 | 20 | 24 | 45 | 52 |
| IIMP at −40° C. (ft. lbs) | 38 | 35 | 36 | 8 | 5 | 35 | 31 |
| IIMP after multiple solvent treatment | fail | pass | pass | fail | fail | fail | fail |

TABLE 3

| Property | Comp. 1 (CR) | Comp. 1 (CR) (5% LLDPE) | Comp. 1 (CR) (5% LLDPE) + nucleator | Comp. 2 (CR) | Comp. 2 (CR) (5% LLDPE) |
| --- | --- | --- | --- | --- | --- |
| MFR | 19 | 20 | 20 | 20 | 20 |
| Flexural Modulus (kpsi) | 119 | 99 | 110 | 126 | 124 |
| Izod (ft. lbs/in) | NB | NB | NB | NB | NB |
| Break strain (%) | 303 | 340 | 330 | 262 | 269 |
| IIMP at −40° C. (ft. lbs) | — | 38 | 35 | — | 39 |
| IIMP after multiple solvent treatment | fail | pass/fail | pass/fail | fail | fail | at least one subsequent polymerization reactor to form an ethylene/propylene rubber, said thermoplastic polyolefin comprising, about 60 percent to about 80 percent by weight of a xylene insoluble fraction comprising propylene homopolymer or random copolymer; and about 20 percent to about 40 percent by weight of a xylene soluble fraction comprising ethylene/propylene rubber, said xylene soluble fraction containing from about 25 percent to about 45 percent by weight of ethylene; and said thermoplastic polyolefin composition having a melt flow rate of at least 20 dg/min without visbreaking;

wherein the ratio r of the molecular weight of the xylene soluble fraction to the molecular weight of the xylene insoluble fraction is about 1.4 or less as measured by the equation:

$$r = Mw_{(XS)}/Mw_{(XIS)} \text{ where:}$$

$Mw_{(XS)}$ is the weight average molecular weight (Mw) of said xylene soluble fraction, and $MW_{(XIS)}$ is the weight average molecular weight (Mw) of said xylene insoluble fraction.

2. The composition according to claim 1, wherein the ratio r of the molecular weight of the xylene soluble fraction to the molecular weight of the xylene insoluble fraction is from about 1 to about 1.4.

3. The composition according to claim 1, wherein said thermoplastic polyolefin comprises:

about 70 percent to about 80 percent by weight of a xylene insoluble fraction, and about 20 percent to about 30 percent by weight of a xylene soluble fraction.

4. The composition according to claim 1, wherein the composition is compounded with up to about 10 percent by weight of at least one impact modifier.

5. The composition according to claim 4, wherein said at least one impact modifier is selected from the group consisting of: linear low density polyethylene, low density polyethylene, high density polyethylene, styrene-butadiene copolymer, styrene-isoprene copolymer, styrene-ethylene-butylene-styrene copolymer, styrene-ethylene-propylene-styrene copolymer and metallocene ethylene propylene copolymer.

6. The composition according to claim 1, wherein said at least one first polymerization reactor is a liquid phase reactor and said at least one subsequent polymerization reactor is gas phase reactor.

7. The composition according to claim 1, wherein said at least one first polymerization reactor and said at least one subsequent polymerization reactor are gas phase reactors.

8. The composition according to claim 1, wherein the ratio, r', of the melt flow rate of said polypropylene homopolymer or random copolymer to the melt flow rate of said thermoplastic polyolefin is from about 0.5 to about 2.2 as determined using the equation:

$$r = MFR_{homo}/MFR_{total} \text{ where:}$$

$MFR_{homo}$ is the melt flow rate of the polypropylene or random copolymer phase, and $MFR_{total}$ is the melt flow rate of the total thermoplastic polyolefin.

9. The composition according to claim 1, wherein propylene is polymerized in said at least one first polymerization reactor to form a propylene homopolymer.

10. The composition according to claim 9, wherein the ratio r of the molecular weight of the xylene soluble fraction to the molecular weight of the xylene insoluble fraction is from about 1 to about 1.4.

11. The composition according to claim 9, wherein said thermoplastic polyolefin comprises:

about 70 percent to about 80 percent by weight of a xylene insoluble fraction, and about 20 percent to about 30 percent by weight of a xylene soluble fraction.

12. The composition according to claim 9, wherein the composition is compounded with further oomprising up to about 10 percent by weight of at least one impact modifier.

13. The composition according to claim 12, wherein said at least one impact modifier is selected from the group consisting of: linear low density polyethylene, low density polyethylene, high density polyethylene, styrene-butadiene copolymer, styrene-isoprene copolymer, styrene-ethylene-butylene-styrene copolymer, styrene-ethylene-propylene-styrene copolymer and metallocene ethylene propylene copolymer.

14. The composition according to claim 9, wherein said at least one first polymerization reactor is a liquid phase reactor and said at least one subsequent polymerization reactor is gas phase reactor.

15. The composition according to claim 9, wherein said at least one first polymerization reactor and said at least one subsequent polymerization reactor are gas phase reactors.

16. The composition according to claim 1, wherein the ratio, r', of the melt flow rate of said polypropylene homopolymer to the melt flow rate of said thermoplastic polyolefin is from about 0.5 to about 2.2 as determined using the equation:

$$r = MFR_{homo}/MFR_{total} \text{ where:}$$

$MFR_{homo}$ is the melt flow rate of the polypropylene phase, and

MFRtotai is the melt flow rate of the total thermoplastic polyolefin.

* * * * *